United States Patent
Gupta et al.

(10) Patent No.: US 9,635,555 B2
(45) Date of Patent: Apr. 25, 2017

(54) ON-LINE SIGNUP AND PROVISIONING OF CERTIFICATE CREDENTIALS FOR WIRELESS DEVICES

(71) Applicant: Intel Corporation, Santa Clara, CA (US)

(72) Inventors: Vivek G. Gupta, San Jose, CA (US); Necati Canpolat, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 14/580,839

(22) Filed: Dec. 23, 2014

(65) Prior Publication Data

US 2015/0110096 A1    Apr. 23, 2015

Related U.S. Application Data

(63) Continuation of application No. 13/728,606, filed on Dec. 27, 2012, now Pat. No. 9,307,408.

(51) Int. Cl.
*H04L 29/02* (2006.01)
*H04W 12/08* (2009.01)
(Continued)

(52) U.S. Cl.
CPC .......... *H04W 12/08* (2013.01); *H04L 63/0823* (2013.01); *H04L 63/108* (2013.01);
(Continued)

(58) Field of Classification Search
CPC ..... H04W 12/06; H04W 12/08; H04W 48/16; H04W 84/12; H04W 76/02; H04L 63/16
See application file for complete search history.

(56) References Cited

U.S. PATENT DOCUMENTS 8,352,643 B2    1/2013   Birnbaum
8,838,070 B2 *  9/2014   Zhang ................... H04W 12/06
                                                    455/411

(Continued)

FOREIGN PATENT DOCUMENTS

CN    101262670 A    9/2008
CN    103688565 A    3/2014
(Continued)

OTHER PUBLICATIONS

"U.S. Appl. No. 13/188,205, Advisory Action mailed Mar. 18, 2016", 5 pgs.

(Continued)

*Primary Examiner* — Shaq Taha
(74) *Attorney, Agent, or Firm* — Schwegman Lundberg & Woessner, P.A.

(57) ABSTRACT

Embodiments of a mobile device and method for secure online sign-up and provisioning of credentials for Wi-Fi hotspots are generally described herein. In some embodiments, provisioning occurs using a service set identifier (SSID) to associate with a hotspot and retrieve a virtual LAN (VLAN) identifier. The VLAN identifier is used to complete the signup and provisioning process. In some embodiments, a hotspot may implement a primary SSID and a dependent SSID. The mobile device associates with the hotspot using the dependent SSID to perform the secure online signup and provisioning process. Once credentials are obtained using the signup and provisioning process, the device can connect to the hotspot using the primary SSID and the already provisioned credentials. The provisioned credentials may include certificates, username/password, or SIM-type credentials.

13 Claims, 10 Drawing Sheets

(51) Int. Cl.
*H04L 29/06* (2006.01)
*H04W 12/04* (2009.01)
*H04W 4/00* (2009.01)
*H04W 84/12* (2009.01)

(52) U.S. Cl.
CPC ............ *H04W 12/04* (2013.01); *H04W 4/001* (2013.01); *H04W 84/12* (2013.01)

(56) References Cited

U.S. PATENT DOCUMENTS

| | | | |
|---|---|---|---|
| 9,307,408 | B2 | 4/2016 | Gupta et al. |
| 2004/0210468 | A1 | 10/2004 | Rubel et al. |
| 2006/0045267 | A1 | 3/2006 | Moore et al. |
| 2006/0072527 | A1 | 4/2006 | Beck et al. |
| 2006/0173976 | A1 | 8/2006 | Vincent et al. |
| 2007/0066306 | A1 | 3/2007 | Cheng |
| 2007/0294385 | A1 | 12/2007 | Kapadekar et al. |
| 2008/0140814 | A1 | 6/2008 | Cohen |
| 2008/0220741 | A1 | 9/2008 | Hung |
| 2008/0225805 | A1 | 9/2008 | Pearson et al. |
| 2009/0199281 | A1 | 8/2009 | Cai et al. |
| 2009/0260070 | A1 | 10/2009 | Soliman |
| 2010/0031029 | A1 | 2/2010 | Ilyadis |
| 2011/0055411 | A1 | 3/2011 | Taaghol |
| 2011/0154454 | A1 | 6/2011 | Frelechoux et al. |
| 2011/0269449 | A1 | 11/2011 | Kazmi et al. |
| 2012/0047245 | A1 | 2/2012 | Zhou et al. |
| 2012/0149334 | A1 | 6/2012 | Zhang et al. |
| 2012/0203824 | A1 | 8/2012 | Oommen |
| 2012/0210404 | A1* | 8/2012 | Patil .................... H04L 41/0293 726/6 |
| 2012/0284785 | A1 | 11/2012 | Salkintzis et al. |
| 2013/0007853 | A1 | 1/2013 | Gupta et al. |
| 2013/0024921 | A1 | 1/2013 | Gupta et al. |
| 2013/0103939 | A1 | 4/2013 | Radpour |
| 2013/0232561 | A1 | 9/2013 | Gupta et al. |
| 2013/0298209 | A1* | 11/2013 | Targali ................. H04L 63/0815 726/6 |
| 2014/0029512 | A1* | 1/2014 | Chu .................... H04L 63/0892 370/328 |
| 2014/0134980 | A1* | 5/2014 | Singh .................... H04L 9/3263 455/411 |
| 2014/0185597 | A1 | 7/2014 | Gupta et al. |

FOREIGN PATENT DOCUMENTS

| | | |
|---|---|---|
| CN | 104798430 A | 7/2015 |
| CN | 105635165 A | 6/2016 |
| EP | 2673988 A1 | 12/2013 |
| EP | 2735183 B1 | 9/2016 |
| JP | 2006523412 A | 10/2006 |
| JP | 2014526726 A | 10/2014 |
| WO | WO-2004/084465 A2 | 9/2004 |
| WO | WO-2007024400 A2 | 3/2007 |
| WO | WO-2010124162 A2 | 10/2010 |
| WO | WO-2012036992 A2 | 3/2012 |
| WO | WO-2012107639 A1 | 8/2012 |
| WO | WO-2012110694 A1 | 8/2012 |
| WO | WO-2013013040 A2 | 1/2013 |
| WO | WO-2013013040 A3 | 1/2013 |
| WO | WO-2013066348 A1 | 5/2013 |
| WO | WO-2014105114 A1 | 7/2014 |
| WO | WO-2014123576 A1 | 8/2014 |

OTHER PUBLICATIONS

"U.S. Appl. No. 13/188,205, Examiner Interview Summary mailed Mar. 10, 2016", 3 pgs.
"U.S. Appl. No. 13/188,205, Examiner Interview Summary mailed Sep. 21, 2015", 3 pgs.
"U.S. Appl. No. 13/188,205, Final Office Action mailed Oct. 13, 2015", 25 pgs.
"U.S. Appl. No. 13/188,205, Non Final Office Action mailed Mar. 17, 2015", 22 pgs.
"U.S. Appl. No. 13/188,205, Response filed Mar. 23, 2016 to Final Office Action mailed Oct. 13, 2015", 13 pgs.
"U.S. Appl. No. 13/188,205, Response filed Jun. 17, 2015 to Non Final Office Action mailed Mar. 17, 2015", 8 pgs.
"U.S. Appl. No. 13/728,606, Notice of Allowance mailed Nov. 25, 2015", 7 pgs.
"U.S. Appl. No. 13/728,606, Response filed Oct. 2, 2015 to Non Final Office Action mailed Jul. 2, 2015", 7 pgs.
"Chinese Application Serial No. 201380060673.X, Voluntary Amendment mailed Oct. 28, 2015", w/ English Claims, 17 pgs.
"European Application Serial No. 12814178.5, Extended European Search Report mailed Apr. 9, 2015", 10 pgs.
"European Application Serial No. 12814178.5, Response filed to Oct. 15, 2015 Extended European Search Report mailed Apr. 9, 2015", 26 pgs.
"Japanese Application Serial No. 2015-543034,Voluntary Amendment mailed Mar. 14, 2016", w/ English Claims, 11 pgs.
"WiMAX Forum Network Architecture (Stage 2 and Stage 3: Detailed Protocols and Procedures)[WiMAX Over-The-Air Provisioning & Activation Protocol based on OMA DM Specifications", Wimax Forum Network Architecture—Wimax Over-The-Air Provisioning & Activation Protocol Based on Oma Dm Specifications, vol. Release 1.5, No. Version 1.0.0, (Mar. 26, 2008), 83 pgs.
"Wimax Forum Network Architecture—Architecture, detailed Protocols and Procedures—WIMAX Over-the-Air General Provisioning System Specification", Wimax Forum, [Online]. Retrieved from the Internet: <URL:http://resources.wimaxforum.org/sites/wimaxforum.org/files/technical_document/2011/01/WMF-T33-103-R015v02_OTA-General.pdf>, (Nov. 22, 2009), 32 pgs.
"WISPr 2.0", Wireless Broadband Alliance, Doc Ref. No. WBA/RM/WISPr Version 01.00, (Apr. 8, 2010), 58 pgs.
"WPATM Deployment Guidelines for Public Access Wi-Fi® Networks", [Online]. Retrieved from the Internet: <http://www.paratorpes.es/cisco/WPA_for_Public_Access_Final.pdf>, (Oct. 28, 2004), 47 pgs.
Cinu, Chacko, "OTA-DM (Over the Air Device Management)", [Online]. Retrieved from the Internet: <http://hosteddocs.ittoolbox.com/CC012507.pdf>, (Feb. 2, 2007), 4 pgs.
"U.S. Appl. No. 13/728,606, Non Final Office Action mailed Jul. 2, 2007", 6 pgs.
"International Application Serial No. PCT/US2013/044238, International Preliminary Report on Patentability mailed Jul. 9, 2015", 8 pgs.
"A new program from the Wi-Fi Alliance to enable seamless Wi-Fi access in hotspots", WiFi Certified Passpoint, (Jun. 2012), 11 pgs.
"U.S. Appl. No. 13/188,205, Examiner Interview Summary mailed Nov. 18, 2013", 3 pgs.
"U.S. Appl. No. 13/188,205, Final Office Action mailed Aug. 9, 2013", 23 pgs.
"U.S. Appl. No. 13/188,205, Non Final Office Action mailed Mar. 20, 2013", 22 pgs.
"U.S. Appl. No. 13/188,205, Response filed Jul. 19, 2013 to Non Final Office Action mailed Mar. 20, 2013", 16 pgs.
"U.S. Appl. No. 13/188,205, Response filed Dec. 9, 2013 to Final Office Action mailed Aug. 9, 2013", 13 pgs.
"U.S. Appl. No. 13/512,105, Final Office Action mailed Jan. 22, 2014", 12 pgs.
"U.S. Appl. No. 13/512,105, Non Final Office Action mailed Aug. 15, 2013", 10 pgs.
"U.S. Appl. No. 13/512,105, Preliminary Amendment filed May 25, 2012", 3 pgs.
"U.S. Appl. No. 13/512,105, Response filed Dec. 16, 2013 to Non Final Office Action mailed Aug. 15, 2013", 10 pgs.
"U.S. Appl. No. 13/728,606, Preliminary Amendment filed Dec. 23, 2014", 8 pgs.
"U.S. Appl. No. 13/728,606, Response filed May 13, 2015 to Restriction Requirement mailed Mar. 17, 2015", 8 pgs.
"U.S. Appl. No. 13/728,606, Restriction Requirement mailed Mar. 17, 2015", 5 pgs.
"U.S. Appl. No. 14/124,767, Preliminary Amendment filed Dec. 6, 2013", 9 pgs.

(56) References Cited

OTHER PUBLICATIONS

"Hotspot 2.0 (Release 2) Technical Specification: Version 1.20a", Wi-Fi Alliance Technical Committee Hotspot 2.0 Technical Task Group, (2012), 145 pgs.
"International Application Serial No. PCT/US2011/059367, International Preliminary Report on Patentability mailed May 15, 2014", 7 pgs.
"International Application Serial No. PCT/US2011/059367, International Search Report mailed Apr. 24, 2012", 3 pgs.
"International Application Serial No. PCT/US2011/059367, Written Opinion mailed Apr. 24, 2012", 5 pgs.
"International Application Serial No. PCT/US2012/047403, International Preliminary Report on Patentability mailed Jan. 30, 2014", 6 pgs.
"International Application Serial No. PCT/US2012/047403, International Search Report mailed Jan. 21, 2013", 3 pgs.
"International Application Serial No. PCT/US2012/047403, Written Opinion mailed Jan. 21, 2013", 4 pgs.
"International Application Serial No. PCT/US2013/044238, International Search Report mailed Aug. 27, 2013", 3 pgs.
"International Application Serial No. PCT/US2013/044238, Written Opinion mailed Aug. 27, 2013", 6 pgs.
"International Application Serial No. PCT/US2013/052743, International Search Report mailed Nov. 1, 2013", 3 pgs.
"International Application Serial No. PCT/US2013/052743, Written Opinion mailed Nov. 1, 2013", 5 pgs.
"Korean Application Serial No. 10-2012-57704, Office Action mailed Aug. 17, 2012", w/English translation, 5 pgs.
"Korean Application Serial No. 10-2012-57704, Response filed Oct. 17, 2012 to Office Action mailed Aug. 17, 2012", w/English claims, 21 pgs.
"The Future of Hotspots: Making Wi-Fi as Secure and Easy to Use as Cellular", Cisco, White Paper, (2012), 9 pgs.
"Wi-Fi Certified Passpoint", Xirrus White Paper, (2012), 5 pgs.
"Wi-Fi Certified Passpoint (Release 1) Deployment Guidelines", Wi-Fi Alliance Hotspot 2.0 Technical Task Group. Version 1.0, (Oct. 2012), 25 pgs.
"Wi-Fi Certified Passpoint Architecture for Public Access", Aruba White Paper, (2011), 15 pgs.
Aboba, Bernard, "IEEE P802.11 Wireless LANs: Virtual Access Points", [Online]. Retrieved from the Internet: <URL: http://aboba.drizzlehosting.com/IEEE/11-03-154r1-I-Virtual-Access-Points.doc>, (May 22, 2003), 13 pgs.
Nie, Pin, et al., "Flexible Single Sign-On for SIP: Bridging the Identity Chasm", IEEE International Conference on Communications, 2009. ICC '09., (2009), 1-6.
Pfitzmann, Birgit, "Privacy in enterprise identity federation—policies for Liberty 2 single sign on pet 2003", Proc. 3rd Workshop on Privacy Enhancing Technologies (PET 2003)., (2003), 1-19.
"U.S. Appl. No. 13/188,205, Notice of Allowance mailed Oct. 3, 2016", 19 pgs.
"Chinese Application Serial No. 201280036196.9, Office Action mailed Jul. 21, 2016", W/ Machine Translation, 14 pgs.
"European Application Serial No. 13867091.4, Extended European Search Report mailed Jun. 16, 2016", 6 pgs.
"Japanese Application Serial No. 2015-543034, Office Action mailed Apr. 19, 2016", With English Translation, 7 pgs.
"Japanese Application Serial No. 2015-543034, Response filed Jul. 14, 2016 to Office Action mailed Apr. 19, 2016", 2 pgs.
"Network Architecture Architecture, detailed Protocols and Procedures WiMAX® Over-The-Air General Provisioning System Specification", WMF-T33-103-R015v03, (Nov. 30, 2010), 29 pgs.
"WiMAX Forum Network Architecture (Stage 2 and Stage 3: Detailed Protocols and Procedures)[WiMAX Over-The-Air Provisioning & Activation Protocol based on OMA DM Specifications", WMF-T33-104-R015v02, (Mar. 26, 2008), 78 pgs.

\* cited by examiner

ON-LINE SIGNUP AND PROVISIONING OF CERTIFICATE CREDENTIALS FOR WIRELESS DEVICES

CLAIM OF PRIORITY

This patent application is a continuation of U.S. patent application Ser. No. 13/728,606 filed on Dec. 27, 2012, which is incorporated herein by reference in its entirety.

TECHNICAL FIELD

Embodiments pertain to wireless communications. Some embodiments pertain to secure online sign-up and provisioning of credentials for service connectivity. Some embodiments relate to Hotspot 2.0 networks and the Hotspot 2.0 evolution.

BACKGROUND

Signing up for and connecting to a Wi-Fi hotspot is not a simple and user-friendly process. Users may have to confront web pages of different types, enter information and select their usernames/passwords at different locations. Currently, there is no standardized mechanism that defines a secure online signup mechanism for Wi-Fi enabled devices and hotspots. Furthermore, when different types of credentials (username/password, certificate, subscriber-information module (SIM) type credentials, etc.) are provisioned, additional complications arise.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
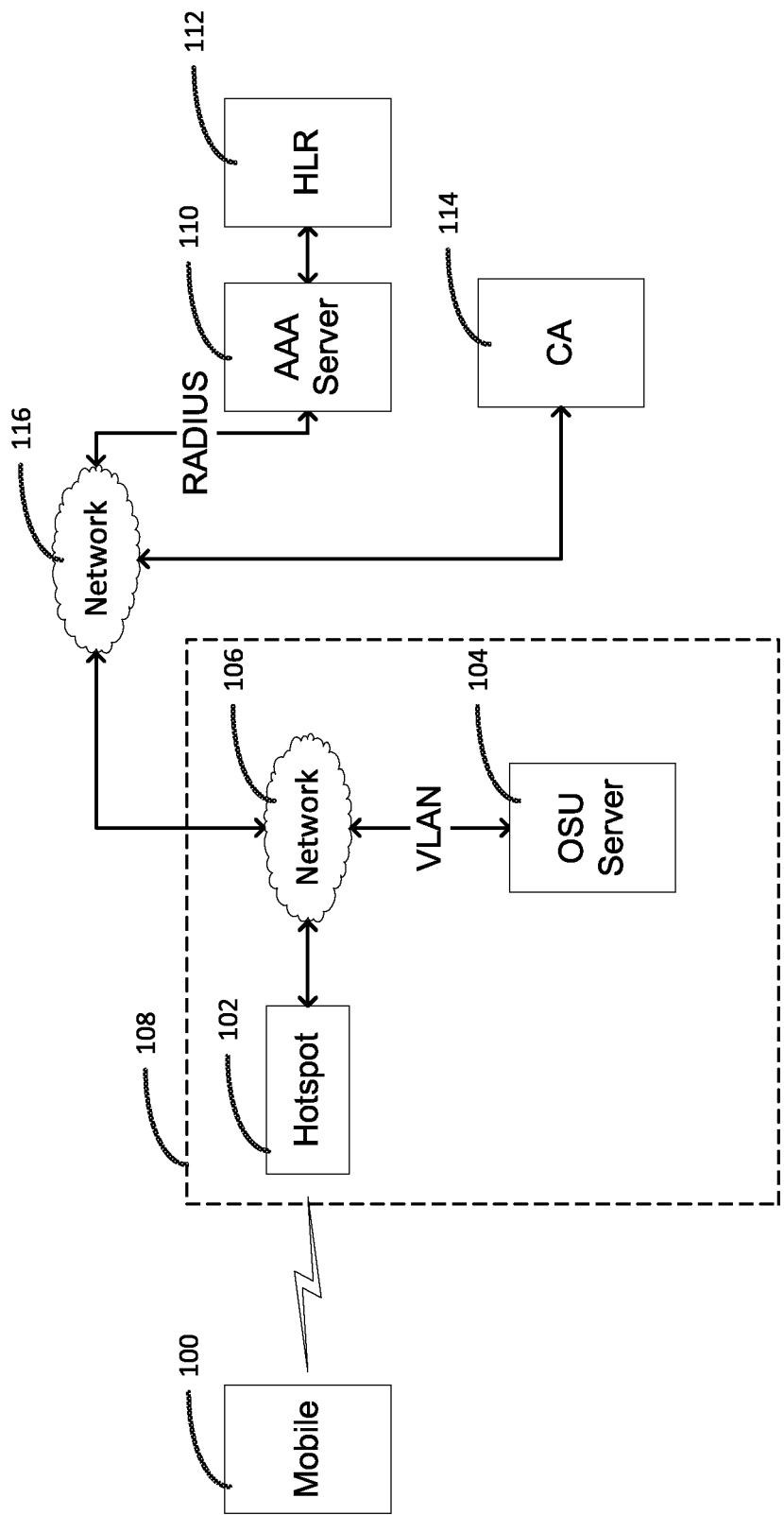
FIG. 1 illustrates a wireless network, according to some embodiments.

FIG. 1 illustrates a wireless network, according to some embodiments. The network forms the operational environment for secure online signup and provisioning of credentials according to some embodiments. In FIG. 1, mobile device 100 (sometimes referred to as User Equipment (UE), a Station (STA), or a wireless device) may be a Wi-Fi enabled device configured to associate with a Wi-Fi hotspot 102 and perform the various functions associated with secure online signup and provisioning. Mobile device 100 may include a device management client (not shown) to implement a device management protocol such as Open Mobile Alliance Device Management (OMA-DM) protocol, a Simple Object Access Protocol Extensible Markup Language (SOAP-XML) protocol or some other management protocol.

Wi-Fi hotspot 102 may be part of a Wi-Fi network and may be coupled to network 106, which can be a local network or router or can be a gateway through which other networks 116 such as the Internet may be accessed, or a combination of both. The Wi-Fi hotspot 102 may operate as a Wi-Fi Access Point (AP).

Wi-Fi hotspot 102 may be coupled to various network elements such as an Online Signup (OSU) server 104, an Authentication, Authorization and Accounting (AAA) server 110, a Home Location Register (HLR) 112, and a Certificate Authority (CA) 114. In some embodiments, an OSU server 104 may implement an OMA-DM protocol. In other embodiments, an OSU server 104 may implement a SOAP-XML protocol or some other management protocol. In some embodiments, an OSU server 104 may act as a proxy to other servers or devices (such as the AAA server 110, HLR 112 and CA 114).

In accordance with embodiments herein, mobile device 100 may be configured for online signup and provisioning of credentials for Wi-Fi hotspots. As described more fully below, these may use a variety of management protocols, such as the OMA-DM, SOAP-XML, or some other protocol. This may allow cellular-type network service providers that may already be implementing one or more of these protocols in their backend core networks to use the same servers and installed components to extend that functionality for servicing Wi-Fi networks. In this way, Wi-Fi networks may operate along with the same cellular-network backend core enabling Wi-Fi offloading from the cellular-type networks in a more seamless and transparent manner. A cellular-type network may refer to any 2G (e.g., GSM, EDGE) or 3G (e.g., 3GPP, 3GPP2) or 4G (e.g., WiMAX, LTE) configured network.

In FIG. 1, Wi-Fi hotspot 102 and OSU server 104 can form part of a captive portal 108. A captive portal can block/intercept IP packets and reroute requests to a designated location. This can provide, for example, a "walled garden" for security purposes.

Figure 2:
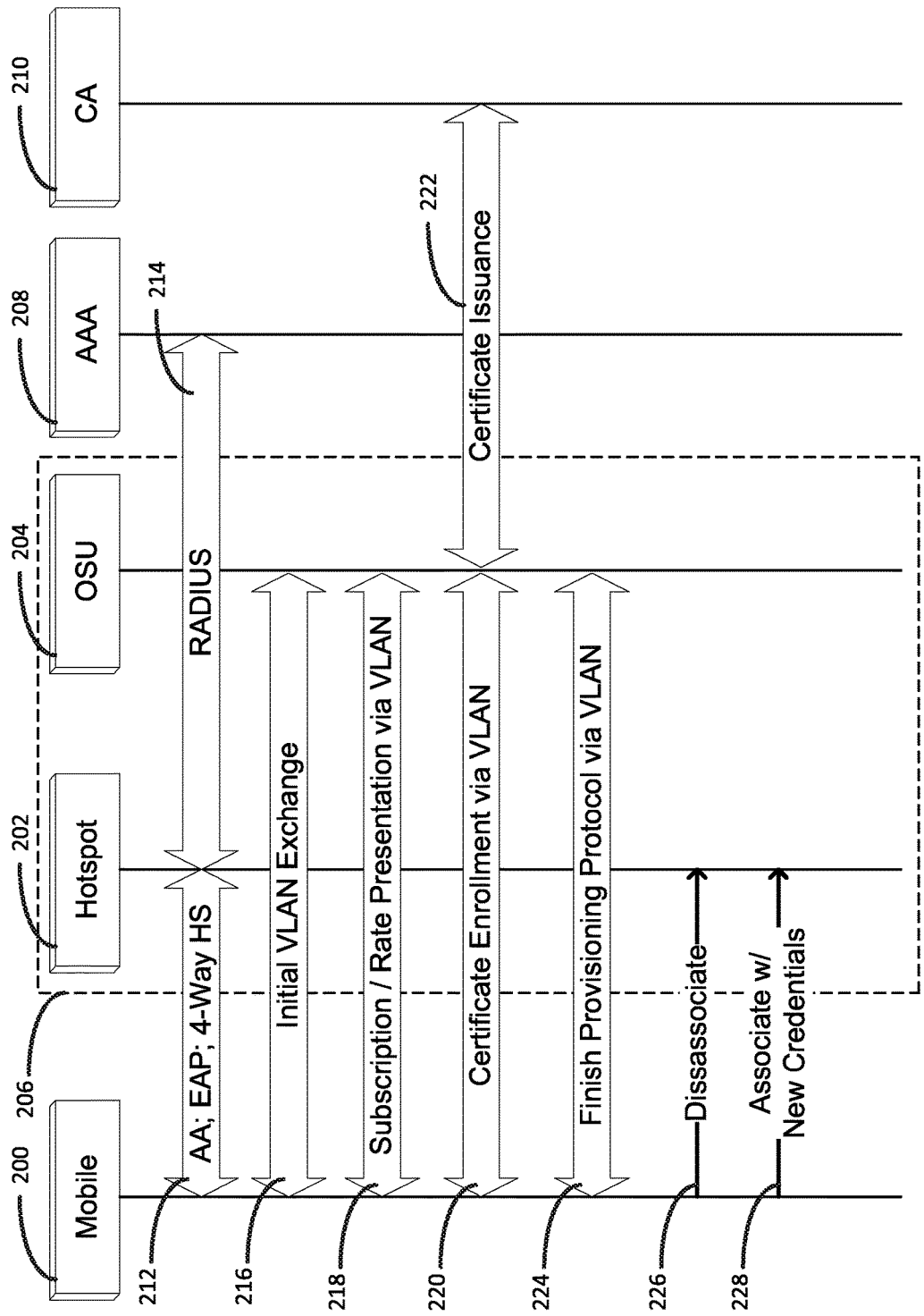
FIG. 2 illustrates an online signup and credential provisioning mechanism, according to some embodiments.

FIG. 2 illustrates an online signup and credential provisioning mechanism, according to some embodiments. In the embodiment of FIG. 2, hotspot 202 has a single Service Set Identifier (SSID), which can be used by devices such as mobile device 200 to associate with the hotspot. Also in FIG. 2, hotspot 202 and OSU server 204 may be part of a captive portal (illustrated by dashed box 206).

In FIG. 2, mobile device 200 uses the single SSID of hotspot 202 to authenticate and associate with hotspot 202 as illustrated by 212 and 214. This process uses anonymous Extensible Authentication Protocol Transport Layer Security (EAP-TLS) with server side authentication and the 4-Way Handshake protocol as depicted. The credentials for mobile device 200 are verified against the home operator's HLR. As part of the initial association process, a Virtual Local Area Network (VLAN) identifier is passed to mobile device 200 to be used for online sign up and credential provisioning.

Different VLAN configurations can be used for different mobile devices with different routing policies.

After mobile device 200 has a VLAN identifier, it can use the VLAN identifier for the remainder of the online signup and provisioning process. Typical steps in such an online signup and provisioning process are illustrated by 216, 218, 220 222, and 224.

The process typically begins with an initial exchange that allows mobile device 200 to make contact with OSU server 204 to start the process. During this initial exchange 216, the OSU typically provides a Universal Resource Identifier (URI) where subscription rates and other such information can be obtained. The initial exchange 216 also typically contains a command for mobile device 200 to launch a browser with the URI obtained from OSU server 204.

Exchange 218 illustrates the process of mobile device 200 and OSU server 204 exchanging registration data as designated by the service provider. This information can form part of the credential section of a subscription management object. After this information has been determined, if the credentials are going to be a user name/password type (as opposed to certificate based or Subscriber Identity Module (SIM) type credentials), the credentials from the trust root AAA server 208 are retrieved and stored in a subscription management object and any TLS sessions are released. This can be illustrated, for example, by exchange 224.

However, if after exchange 218, certificate based credentials are desired, then a certificate enrollment process is launched. This process is illustrated in FIG. 2 by exchange 220 and exchange 222. In exchanges 220 and 222, a certificate is obtained and signed (verified) by CA 210. This can be accomplished, for example, by mobile device 200 using an Internet Engineering Task Force (IETF) Request For Comment 5967 (RFC 5967) style Public Key Cryptography Standard #10 (PKCS #10) request. As indicated by this exchange, OSU server 204 can act as a proxy when having a certificate verified by CA 210. After the certificate has been signed by CA 210, OSU server 204 can respond with an RFC 5967 style PKCS #7 response.

When certificate based credentials are desired, the final exchange is slightly different than previously described in conjunction with exchange 224. When certificate based credentials are desired, after exchange 220 and exchange 222, a subscription management object identifying the credential created by exchange 220 and 222 is retrieved from OSU server 204. Finally, any TLS sessions are released.

Once mobile device 200 has the subscription management object, it dissociates from hotspot 202 as illustrated by 226. Finally, mobile device 200 associates with hotspot 202 using its SSID and the credentials identified in the subscription management object, as indicated by 228.

Figure 3:
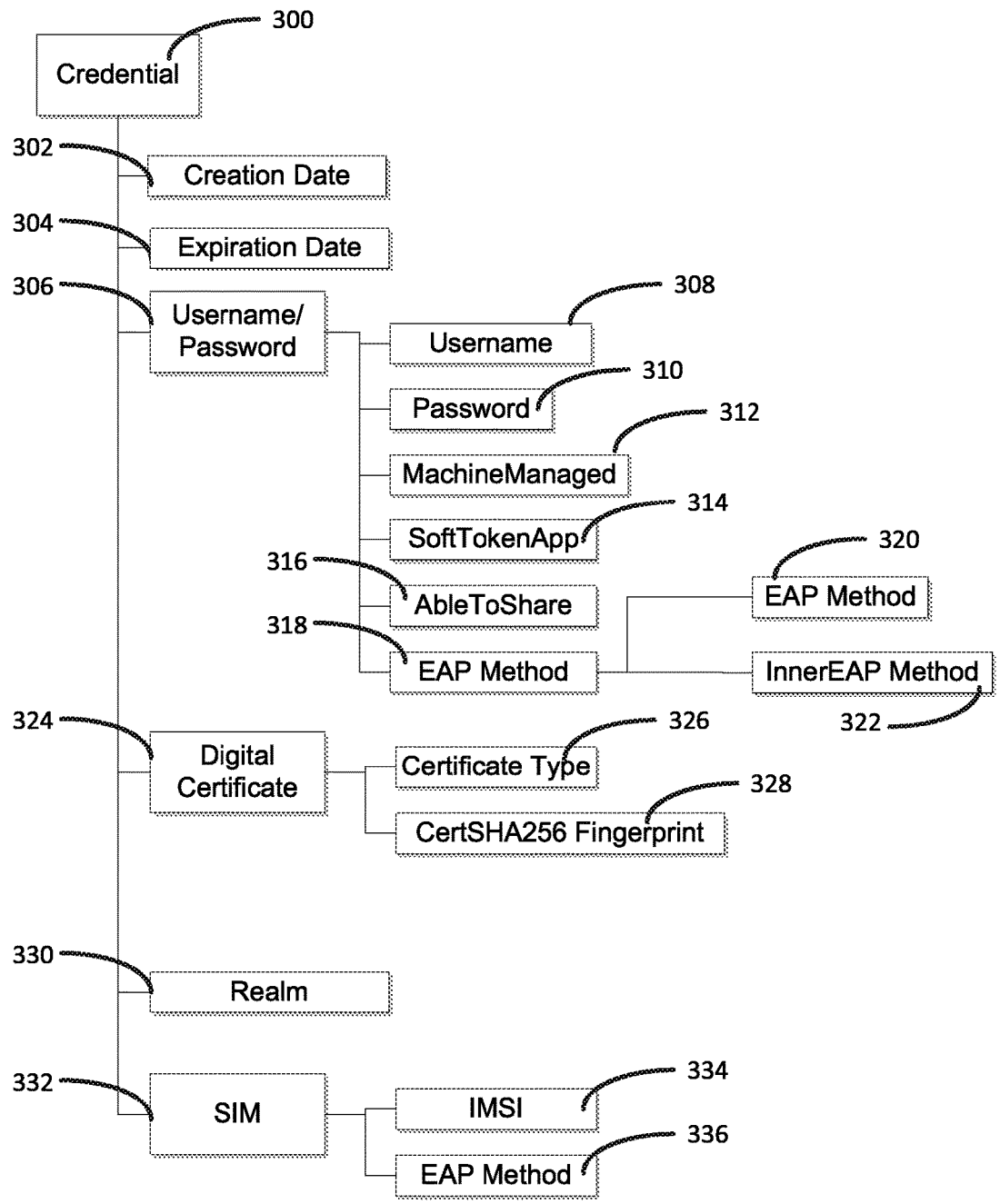
FIG. 3 illustrates a credential section of a subscription management object, according to some embodiments.

FIG. 3 illustrates an example credential section of a subscription management object according to some embodiments. For simplicity, the remainder of the subscription management object is not shown, but the subscription management object can be a PerProviderSubscription Management Object according to the Hotspot 2.0 specification and evolving Hotspot 2.0 specification. In the following description, nodes within the illustrated tree will be referred to as nodes, elements, fields, and/or parameters. All are intended to convey the same meaning and no differences are intended.

The credential section 300 contains creation date 302, which represents the date on which the credential was either created or last updated. Expiration date 304, if present, represents the date the credentials expire. Realm 330 specifies the realm associated with the credential. A mobile device determines if it should be able to successfully authenticate to a hotspot by comparing the realms returned in the Access Network Query Protocol (ANQP) Network Access Identifier (NAI) Realm element during the initial network discovery phase with this realm. IEEE 802.11u capable mobile devices will query IEEE 802.11u capable hotspots for additional information using ANQP. This can include a request for an element called the NAI Realm list. The NAI Realm list includes one or more NAI Realms (defined according to RFC-4282) and optional EAP methods and authentication parameters to access associated with the realm.

Credential section 300 should contain a username/password parameter 306, a digital certificate parameter 324 or a SIM parameter 332, depending on the type of credentials stored.

Username/password parameter 306 includes a variety of parameters, including user name 308 and password 310. Machine managed parameter 312 specifies whether the password is machine managed. SoftTokenApp 314 specifies the application that should be used to generate the password. When this parameter is present, the password should have a null value. AbleToShare 316 indicates whether the credential is usable only on the machine which subscribed (i.e., not AbleToShare), or usable by other machines of the user as well (i.e., AbleToShare). EAP method 318 includes EAP method 320, which indicates the EAP method, and inner EAP method 322, which indicates the tunneled EAP method, if used.

Digital certificate parameter 324 includes digital certificate type 326, which indicates the type of digital certificate (e.g. 802.1ar or x509v3), and certSHA256 fingerprint 328, which provides the SHA-256 fingerprint of the certificate credential for the subscription. This parameter specifies the Issuer Distinguished Name in the certificate credential. In conjunction with the certificate serial number, it uniquely identifies a certificate.

SIM parameter 332 includes the International Mobile device Subscriber Identity (IMSI) number 334 and EAP method 336, which specifies the EAP method to be used for SIM-based authentication (e.g., EAP-SIM, EAP Authentication and Key Agreement (EAP-AKA), etc.).

Figure 4:
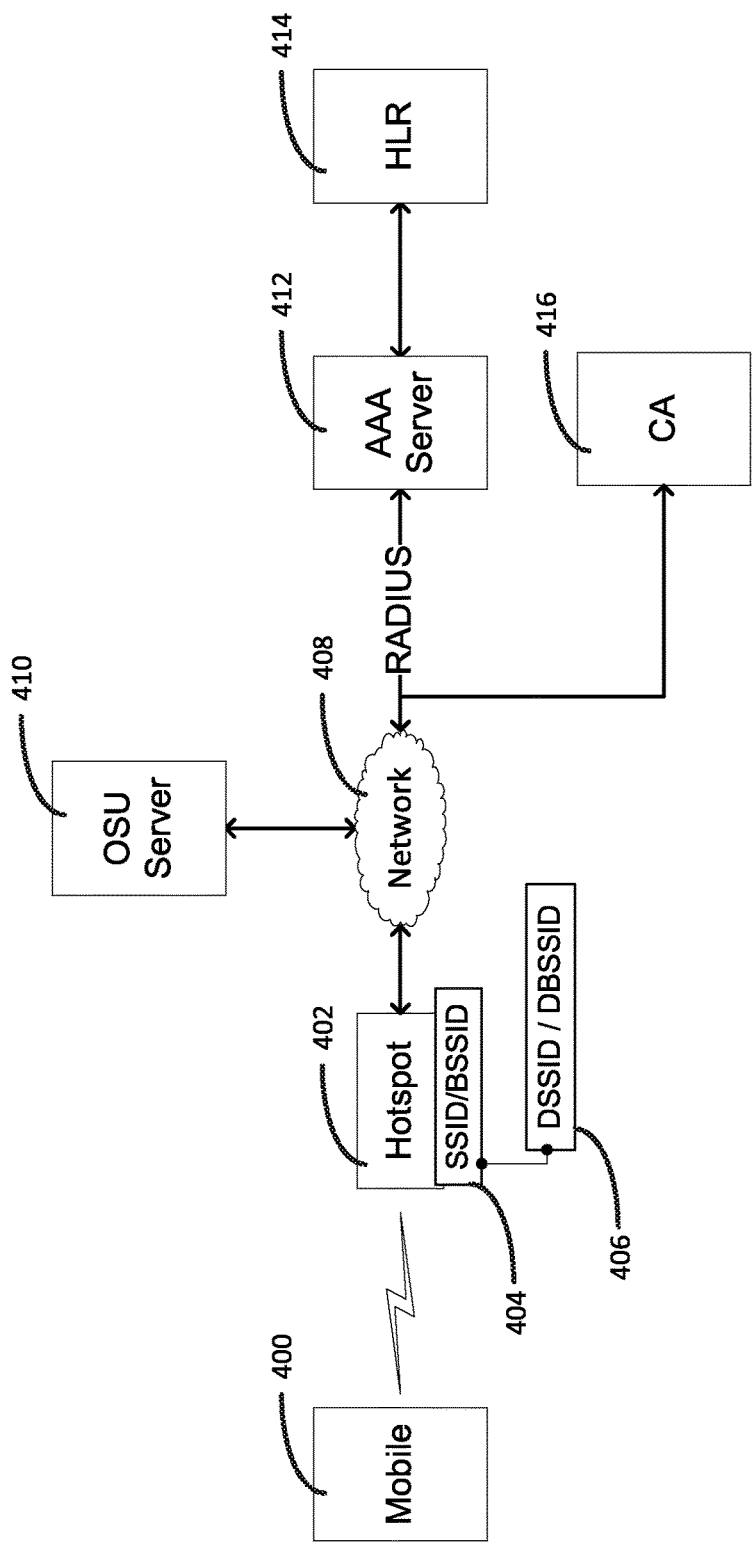
FIG. 4 illustrates a wireless network, according to some embodiments.

FIG. 4 illustrates a wireless network, according to some embodiments. The network forms the operational environment for secure online signup and provisioning of credentials according to some embodiments. In FIG. 4, mobile device 400 (sometimes referred to as UE, or a wireless device) may be a Wi-Fi enabled device configured to associate with a Wi-Fi hotspot 402 and perform the various functions associated with secure online signup and provisioning. Mobile device 400 may include a device management client (not shown) to implement a device management protocol such as a OMA-DM protocol, a SOAP-XML protocol, or some other management protocol.

Wi-Fi hotspot 402 may be part of a Wi-Fi network and may be coupled to network 408, which can be a local network or router, a gateway through which other networks (not shown) such as the Internet may be accessed, or a combination of both. The Wi-Fi hotspot 402 may operate as a Wi-Fi AP.

In the embodiment illustrated in FIG. 4, hotspot 402 has a primary SSID and Basic Service Set Identifier (BSSID) 404 and a dependent SSID and BSSID 406, sharing the same physical network. In this embodiment, the primary SSID is used by devices that already have credentials, and the dependent SSID is used by devices that need to signup for services and provision credentials. The primary and dependent SSIDs and BSSIDs may be related in a defined manner or may be derived one from the other. For example, a phrase or other identifier can be added to the primary SSID (or BSSID) to determine the dependent SSID (or BSSID). In one particular embodiment, the dependent SSID is derived by adding the phrase "HS-Dependent" to the primary SSID. Thus, an SSID of "Starbucks" would yield a dependent SSID of "HS-Dependent-Starbucks." Other phrases and/or identifiers may also be used or some other function or mechanism can be used to derive the dependent SSID from the primary SSID.

Devices wishing to signup and provision credentials with such a hotspot need to discover or identify the dependent SSID (and dependent BSSID) in order to properly associate with hotspot 402 and begin the signup and provisioning process. This can be accomplished in a variety of ways. In the simplest example, the dependent SSID is broadcast just like the primary SSID (or included as part of a probe response). When this occurs, the list of displayed SSIDs can be filtered by a mobile device, such as mobile device 400, to only show the primary SSIDs and not show the dependent SSIDs. Alternatively, if the dependent SSID is derived in a known or predictable manner from the primary SSID, then the device can calculate or determine the dependent SSID from the primary SSID by knowing the primary SSID (which is broadcast in a beacon frame or sent in response to a probe request). Alternatively, or additionally, the dependent SSID can be included in a Wi-Fi Alliance (WFA) vendor specific information element. In yet another example, the primary SSID and primary BSSID can be part of a primary profile that is transmitted as part of a beacon frame or in response to a probe request, and the dependent SSID and dependent BSSID can be part of a dependent profile that is not transmitted. The dependent profile may be included as part of an OSU provider list. In yet another example, the multiple BSSID elements can be included in the beacon frame or in response to a probe request. These various examples and embodiments can be combined in a variety of ways to get still other embodiments. Depending on the exact embodiment, the primary SSID and dependent SSID may have the same or different radio coverage areas.

Wi-Fi hotspot 402 may be coupled to various network elements such as an OSU server 410, an AAA server 412, a HLR 414, and a CA 416. In some embodiments, the OSU server 410 may implement an OMA-DM protocol. In other embodiments, the OSU server 410 may implement a SOAP-XML protocol or some other management protocol. In some embodiments, the OSU server 410 may act as a proxy to other servers or devices (such as the AAA server 412, HLR 414, and CA 416).

In accordance with embodiments herein, mobile device 400 may be configured for online signup and provisioning of credentials for Wi-Fi hotspots. As described more fully below, these may use a variety of management protocols, such as the OMA-DM, SOAP-XML, or some other protocol. This may allow cellular-type network service providers that may already be implementing one or more of these protocols in their backend core networks to use the same servers and installed components to extend that functionality for servicing Wi-Fi networks. In this way, Wi-Fi networks may operate along with the same cellular-network backend core, thereby enabling Wi-Fi offloading from the cellular-type networks in a more seamless and transparent manner. A cellular-type network may refer to any 2G (e.g., GSM, EDGE), 3G (e.g., 3GPP, 3GPP2), or 4G (e.g., WiMAX, LTE) configured network.

Figure 5:
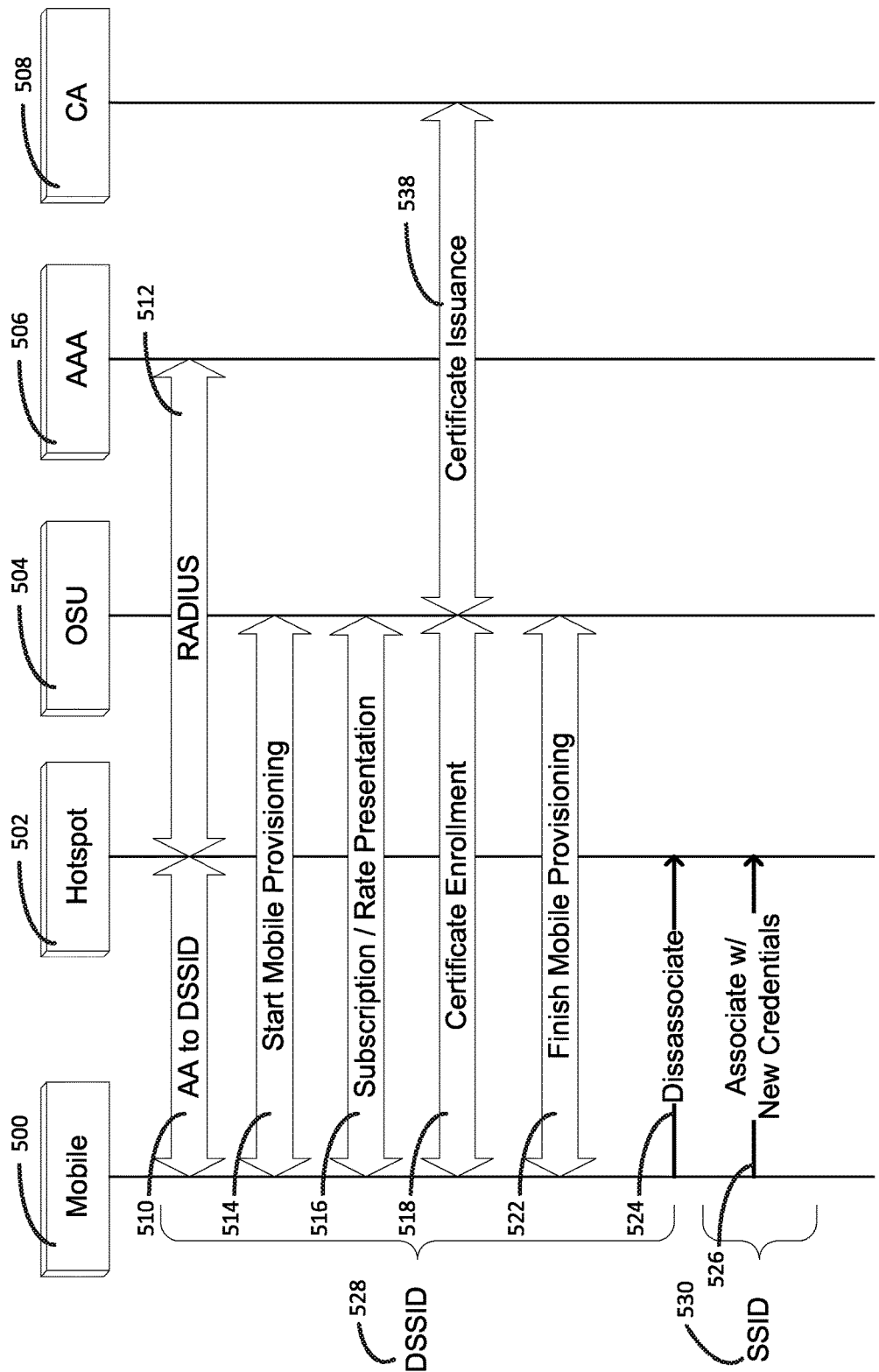
FIG. 5 illustrates an online signup and credential provisioning mechanism, according to some embodiments.

FIG. 5 illustrates an online signup and credential provisioning mechanism, according to some embodiments. In the embodiment of FIG. 5, hotspot 502 has a primary SSID 530 and a dependent SSID 528. Hotspot 502 may also have a primary BSSID and a dependent BSSID (neither of which are shown). These can be related or derivable in some fashion, as described above. Mobile devices will use the dependent SSID 528 for online signup and credential provisioning, and will use the primary SSID 530 for normal connection to use hotspot services if the mobile device already has credentials (or has already provisioned credentials).

The signup and provisioning process begins at exchange 510 and exchange 512 where the mobile device uses the dependent SSID to authenticate and associate with hotspot 502. This process may use anonymous EAP-TLS with server side authentication. The credentials for mobile device 500 are verified against the home operator's HLR through the AAA server 506 as indicated by exchange 512.

Exchange 514 allows mobile device 500 to contact OSU server 504 to start the signup and provisioning process. During this initial exchange 514, OSU server 504 provides a URI where subscription rates and other such information can be obtained. The initial exchange 514 also typically contains a command for mobile device 500 to launch a browser with the URI obtained from OSU server 504.

Exchange 516 illustrates the process of mobile device 500 and OSU server 504 exchanging registration data as designated by the service provider. This information can form part of a subscription management object. After this information has been determined, if the credentials are going to be a user name/password type (as opposed to certificate based or SIM type credentials), the credentials from the trust root AAA server 506 are retrieved and stored in a subscription management object, and any TLS sessions are released. This can be illustrated, for example, by exchange 522.

However, if after exchange 516, certificate based credentials are desired, then a certificate enrollment process is launched. This process is illustrated by exchange 518 and exchange 538. In exchange 518 and 538, a certificate is obtained and signed (verified) by CA 508. This can be accomplished, for example, by mobile device 500 using an IETF RFC 5967 style PKCS #10 request. As indicated by this exchange, OSU server 504 can act as a proxy when having a certificate verified by CA 508. After the certificate has been verified by CA 508, OSU server 504 can respond with a RFC 5967 style PKCS #7 response.

When certificate based credentials are desired, the final exchange is slightly different than previously described in conjunction with exchange 522. When certificate based credentials are desired, after exchange 518 and exchange 538, a subscription management object, identifying the credentials created by exchange 518 and 538, is retrieved from OSU server 504. Finally, any TLS sessions are released.

Once mobile device 500 has the subscription management object, it disassociates from hotspot 502 as illustrated by 524. Finally, mobile device 500 associates with hotspot 502 using its primary SSID 530 and the credentials identified in the subscription management object as indicated by 526.

Figure 6:
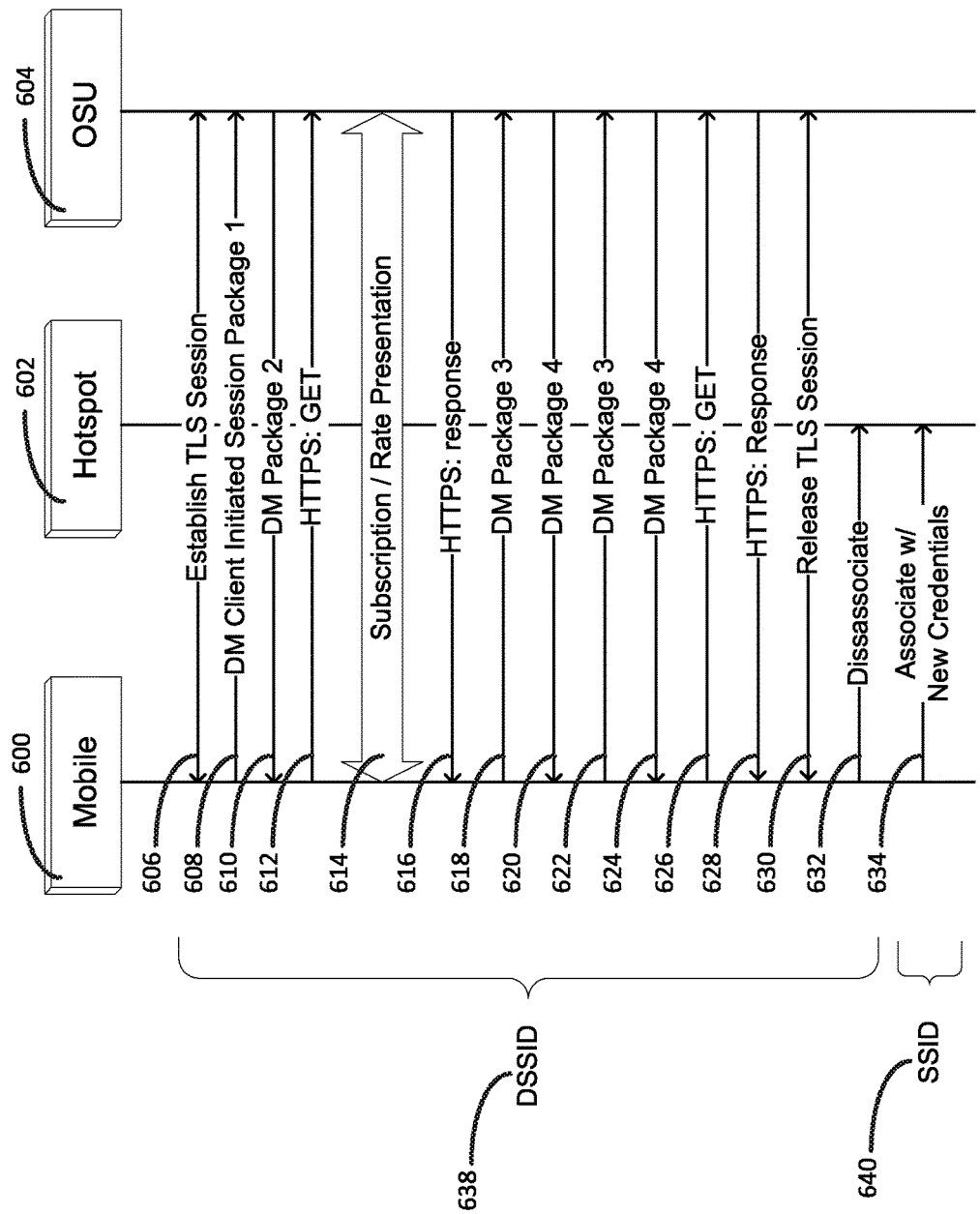
FIG. 6 illustrates an online signup and credential provisioning mechanism, according to some embodiments.

FIG. 6 illustrates an online signup and credential provisioning mechanism, according to some embodiments. In this embodiment, provisioning is for username/password type credentials using OMA-DM management messages configured in accordance with the OMA-DM protocol. These messages are referred to as OMA-DM package 1 messages, OMA-DM package 2 messages, OMA-DM package 3 messages, and OMA-DM package 4 messages. The OMA-DM protocol may be specified by the OMA-DM Working Group and the Data Synchronization (DS) Working Group in an OMA-DM specification.

Online signup and provisioning begin with mobile device 600 associating (not shown) with hotspot 602 using the dependent SSID 638. After associating with hotspot 602, mobile device 600 initiates a TLS connection to OSU server 604 in exchange 606 and performs server-side authentication using secure Hypertext Transfer Protocol (HTTPS).

In exchange 608, mobile device 600 sends a DM package 1 to OSU server 604, containing the DevInfo and DevDetail management objects and a Generic Alert indicating the reason for contacting OSU server 604. The reason element in the Generic Alert is set to 'SubscriptionCreation,' indicating that the user of mobile device 600 wants to establish a new subscription with this service provider. The DevDetail management object contains general mobile device information, and the DevInfo management object contains information for the OMA-DM or SOAP-XML server. Descriptions of these management objects may be found in the OMA Mobile Device Management Tree Description, Version 1.2.

In exchange 610, OSU server 604 may use the information provided in the DevInfo and DevDetail management objects to determine the type of credential to provision (e.g., username/password or certificate). In this example, OSU server 604 will provision username/password type credentials. OSU server 604 returns a DM package 2 to the client with the command Execute:LaunchBrowsertoURI to launch a browser on mobile device 600 directed to the included URI.

Upon receiving the Execute:LaunchBrowsertoURI command, the mobile device launches the browser, establishes a secure HTTPS connection to the URI returned in exchange 610, and sends an HTTPS GET request to the OSU server URI returned in exchange 610. This is illustrated in FIG. 6 by exchange 612. For the purposes of this disclosure, the term browser is used to refer to a browser function that is capable of rendering webpages on a mobile device's user interface. It is not meant to imply a stand-alone application. For example, an implementation could include a browser function in a connection manager.

In exchange 614, mobile device 600 and OSU server 604 exchange registration data as designated by the service provider. In certain circumstances, the user can have a subscription that was provisioned using a different mobile device than the one currently in use, or the original mobile device may have been re-imaged, or the user had previously set up an account with the service provider (e.g., through their website). In these situations, the subscription has been established, but the mobile device is not in possession of the username/password credential. The message flows of this step may accommodate this scenario and permit the user to have the mobile device provisioned with the credential bound to the previously established subscription.

At the end of the subscription provisioning process, OSU server 604 returns the sppUserInputResponse XML instance document, as illustrated by exchange 616. If no error occurs, the sppUserInputResponse is a container for sppStatus and the PerProviderSubscription management object URI. The sppUserInputResponse XML instance document is returned with its HTTP content-type set to "application/vnd.wfa.cm+xml."

If the status of the subscription creation was successful, mobile device 600 sends a DM package 3 to OSU server 604 containing the status of the previous command execution, as illustrated by 618. If there is an error in the establishment of a new subscription, then the mobile device will receive a DM Package 4 (not shown), which indicates the end of the OMA DM transaction.

OSU server 604 sends a DM package 4 to mobile device 600, containing the PerProviderSubscription management object and the command ADD, specifying the location of the PerProviderSubscription management object to be added to the OMA-DM management tree on mobile device 600, as illustrated in exchange 620. In exchange 622, mobile device 600 sends a DM Package 3 indicating the status of the previous operation. In response, OSU server 604 sends a DM Package 4, which indicates the end of the OMA DM transaction, as illustrated in 624.

After the end of the OMA-DM transaction, the mobile device 600 retrieves the AAA server trust root from the URL specified in the PerProviderSubscription management object, as illustrated in 626. The mobile device transmits the HTTPS Get request for the URL to OSU server 604, which may provide HTTP Proxy service, if needed, to retrieve the AAA server certificate from the host identified in the URL (exchange 628).

In exchange 630, mobile device 600 releases the TLS session that was established in 606. Mobile device 600 then disassociates from the Wi-Fi access network, as illustrated by 632.

If the subscription was established successfully in exchange 618, the mobile device 600 may associate with the new credentials using the primary SSID 640, as illustrated in 634.

Figure 7:
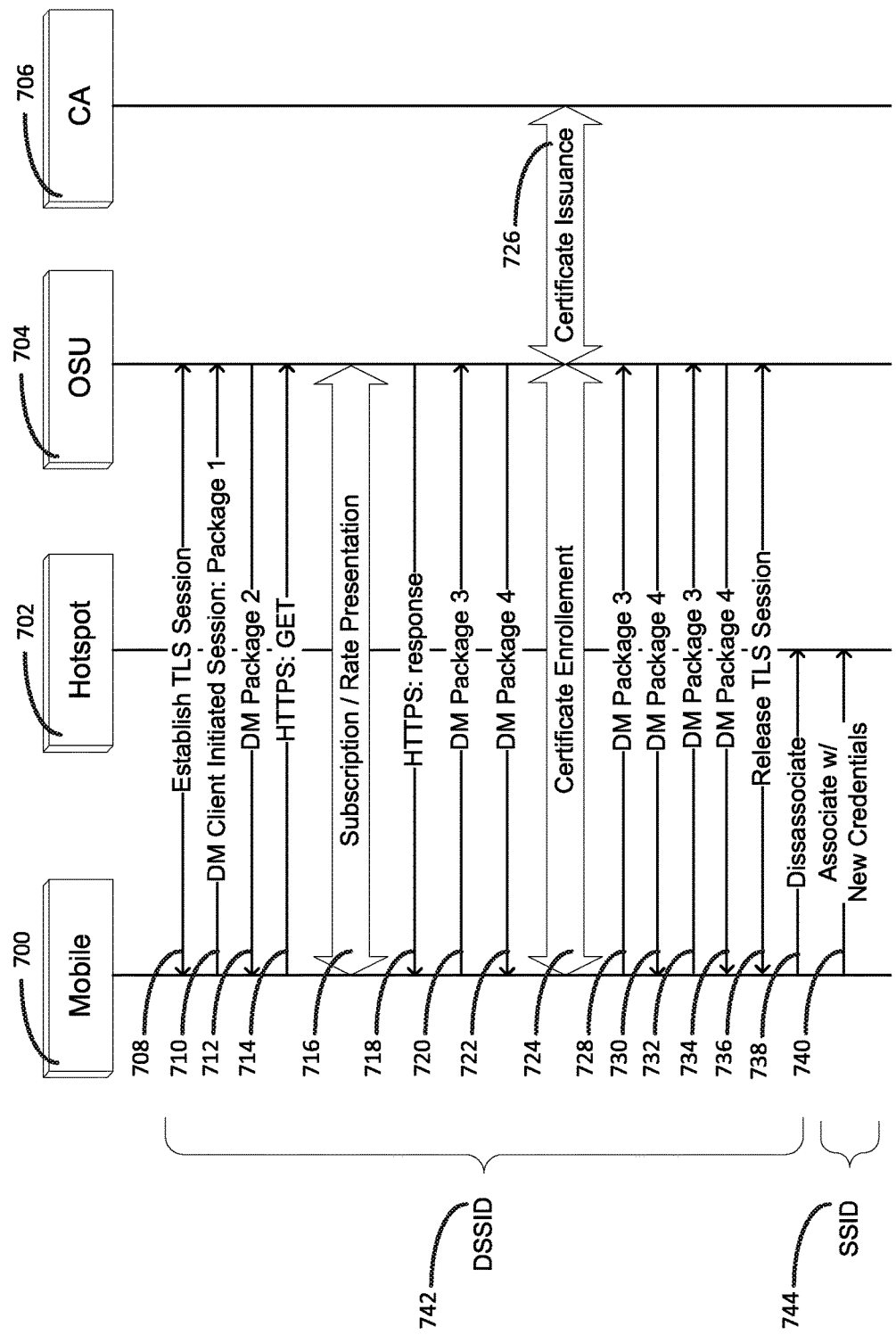
FIG. 7 illustrates an online signup and credential provisioning mechanism, according to some embodiments.

FIG. 7 illustrates an online signup and credential provisioning mechanism, according to some embodiments. In this embodiment, provisioning is for certificate type credentials using OMA-DM management messages configured in accordance with the OMA-DM protocol. These messages are referred to as OMA-DM package 1 messages, OMA-DM package 2 messages, OMA-DM package 3 messages, and OMA-DM package 4 messages.

Online signup and provisioning begin with mobile device 700 associating (not shown) with hotspot 702 using the dependent SSID 742. After associating with hotspot 702, mobile device 700 initiates a TLS connection to OSU server 704 in exchange 708, and performs server-side authentication using secure HTTPS.

In exchange 710, mobile device 700 sends a DM package 1 to OSU server 704, containing the DevInfo and DevDetail management objects and a Generic Alert indicating the reason for contacting OSU server 704. The reason element in the Generic Alert is set to 'SubscriptionCreation,' indicating that the user of mobile device 700 wants to establish a new subscription with this service provider. The DevDetail management object contains general mobile device information, and the DevInfo management object contains information for the OMA-DM or SOAP-XML server. Descriptions of these management objects may be found in the OMA Mobile Device Management Tree Description, Version 1.2.

In exchange 712, OSU server 704 may use the information provided in the DevInfo and DevDetail management objects to determine the type of credential to provision (e.g., username/password or certificate). In this example, OSU server 704 will provision certificate type credentials. OSU server 704 returns a DM package 2 to the client with the command Execute:LaunchBrowsertoURI to launch a browser on mobile device 700 directed to the included URI.

Upon receiving the Execute:LaunchBrowsertoURI command, the mobile device 700 launches the browser, establishes a secure HTTPS connection to the URI returned in exchange 712, and sends an HTTPS GET request to the OSU server URI returned in exchange 712. This is illustrated in FIG. 7 by exchange 714.

In exchange 716, mobile device 700 and OSU server 704 exchange registration data as designated by the service provider. In certain circumstances, the user can have a subscription that was provisioned using a different mobile device than the one currently in use, the original mobile device may have been re-imaged, or the user had previously set up an account with the service provider (e.g., through their website). In these situations, the subscription has been established, but the mobile device is not in possession of the credential. The message flows of this step may accommodate this scenario and permit the user to have the mobile device provisioned with the credential bound to the previously established subscription.

In exchange 718, OSU server 704 returns the status of the subscription creation process. If the status of the subscription creation process is successful, mobile device 700 sends a DM Package 3 with the status of the executed command as successful, as illustrated by exchange 720. If, in exchange 718, the server indicated an error, then mobile device 700 will return an error to the server in exchange 720.

In exchange 722, OSU server 704 sends a DM package 4 to mobile device 700 with the command Execute:CertificateEnrollToURI. This DM package includes the getCertificate XML instance document in the data field. Mobile device 700 performs certificate enrollment in 724 and 726. The AAA server trust root is provided to the mobile device 700 during the certificate enrollment procedure.

As illustrated in exchange 728, if the certificate enrollment execution was successful, mobile device 700 sends a DM Package 3 to OSU server 704. If there is an error in the certificate enrollment execution, then the mobile device goes to exchange 736.

In exchange 730, OSU server 704 sends a DM package 4 to mobile device 700 containing the PerProviderSubscription management object and the command ADD, which specifies the location of the PerProviderSubscription management object to be added to the OMA-DM management tree on the mobile device. In exchange 732, mobile device 700 sends a DM Package 3 with the status of the executed command. In exchange 734, OSU server 704 sends a DM Package 4, which indicates the end of the OMA DM transaction and, as illustrated in 736, mobile device 700 releases the TLS session that was established in exchange 708.

Mobile device 700 disassociates from the network, as illustrated in 738. In exchange 740, mobile device 700 can then associate with hotspot 702 using the credentials obtained in exchange 724 and 726 using the primary SSID 744.

Figure 8:
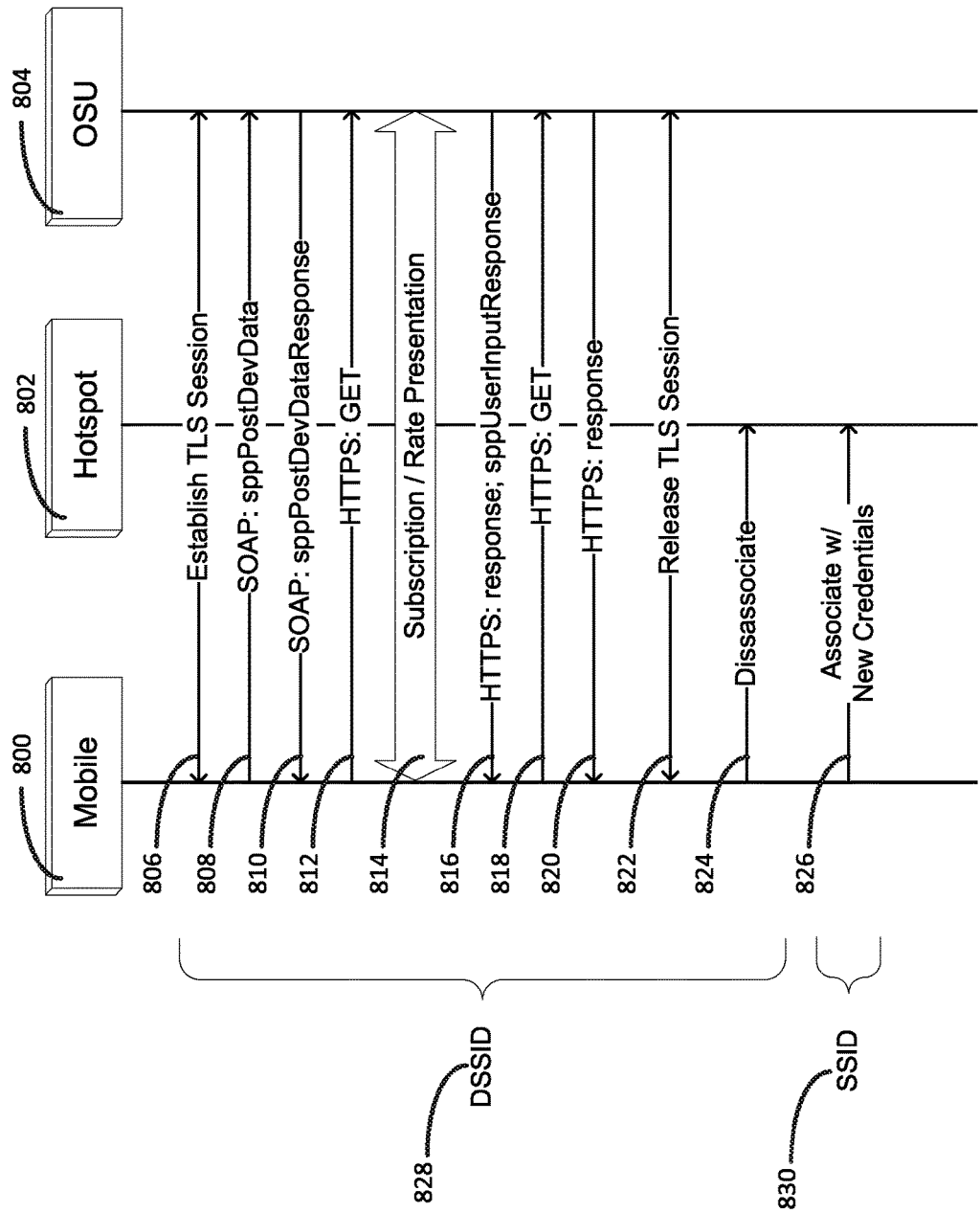
FIG. 8 illustrates an online signup and credential provisioning mechanism, according to some embodiments.

FIG. 8 illustrates an online signup and credential provisioning mechanism, according to some embodiments. In this embodiment, provisioning is for username/password type credentials using SOAP-XML management messages.

Online signup and provisioning begins with mobile device 800 associating (not shown) with hotspot 802 using the dependent SSID 828. After associating with hotspot 802, mobile device 800 initiates a TLS connection to OSU server 804 in exchange 806 and performs server-side authentication using secure HTTPS.

In exchange 808, mobile device 800 transmits sppPostDevData to the server which includes the DevInfo and DevDetail management objects. The value for requestReason is set to "Subscription registration," indicating that mobile device 800 wishes to register for credentials. OSU server 804 may use the information provided in the DevInfo and DevDetail management objects to determine the type of credential to provision (e.g., username/password or certificate).

In exchange 810, OSU server 804 transmits the sppPostDevDataResponse SOAP method to mobile device 800. The content of the response method informs mobile device 800 of the next step in the online signup process. Since mobile device 800 has signaled for subscription registration, OSU server 804 returns a command for the mobile device to launch a browser to the URI supplied in the message. If no errors occur, sppStatus is set to "OK"; an sppStatus value of "OK" also indicates that the credential provisioning process is not complete.

In exchange 812, mobile device 800 transmits an HTTPS GET request to the URI provided in the sppPostDevDataResponse.

In exchange 814, mobile device 800 and OSU server 804 exchange registration data as required by the service provider. In certain circumstances, the user can have a subscription which was provisioned using a different mobile device than the one currently in use, the original mobile device may have been re-imaged, or the user had previously setup an account with the service provider (e.g., through their website). In these situations, the subscription has been established, but the mobile device is not in possession of the username/password credential. The message flows of this step may accommodate this scenario and permit the user to have the mobile device provisioned with the credential bound to the previously established subscription.

At the end of the exchange of registration data, the mobile device 800 may retrieve 804 the sppUserinputResponse XML instance document from OSU server, as illustrated by exchange 816. This XML instance document can be a hidden document included in the webpage delivered to mobile device 800 at the conclusion of entering registration data, rather than a separate exchange as illustrated by 816. If no error occurs, the sppUserinputResponse is a container for sppStatus, the addMO command, and the PerProviderSubscription management object. The sppUserInputResponse XML instance document may be returned having its HTTP content-type set to "application/vnd.wfa.cm+xml." The mobile device 800's web browser may pass this XML instance document to the locally registered helper application for processing (e.g., the connection manager). The PerProviderSubscription management object contains the username and password as well as ancillary provisioning data. Receipt of sppStatus set to "Provisioning complete" indicates to the mobile device 800 that username and password provisioning is complete.

In exchange 818, mobile device 800 uses HTTPS to retrieve the AAA server trust root from the URL specified in the PerProviderSubscription management object. The mobile device may transmit the HTTPS Get request for the URL to the OSU server, which may provide HTTP Proxy service, if needed, to retrieve the AAA server certificate from the host identified in the URL. Exchange 818 is acknowledged by exchange 820 (HTTPS Response).

In 822, mobile device 800 releases the TLS session it established in exchange 806. Mobile device 800 can dissociate from hotspot 802 as illustrated by 824 and then associate to hotspot 802 using the newly established credentials and the primary SSID 830 as illustrated by 826.

Figure 9:
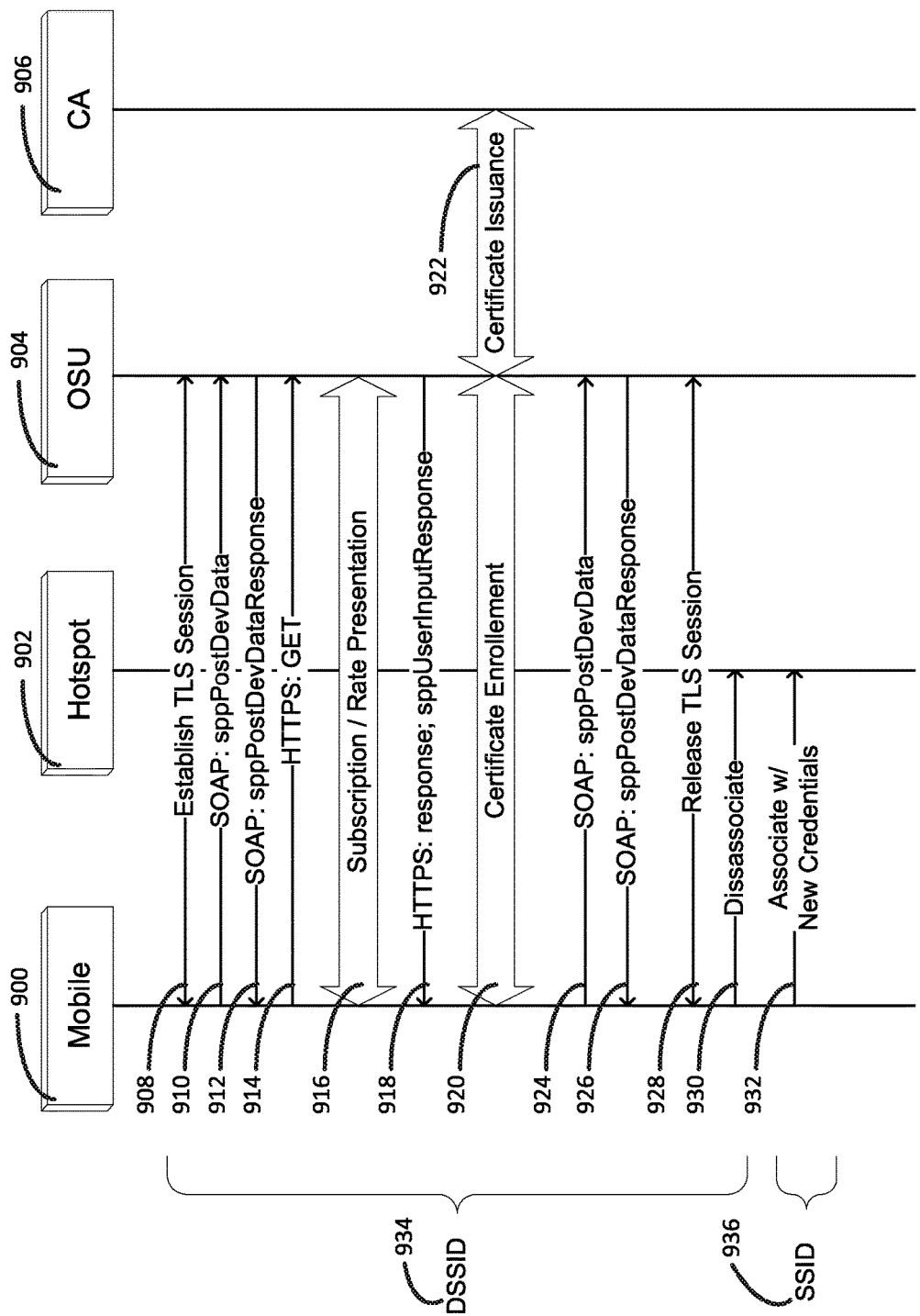
FIG. 9 illustrates an online signup and credential provisioning mechanism, according to some embodiments

FIG. 9 illustrates an online signup and credential provisioning mechanism, according to some embodiments. In this embodiment, provisioning is for credential type credentials using SOAP-XML management messages.

Online signup and provisioning begin with mobile device 900 associating (not shown) with hotspot 902 using the dependent SSID 934. After associating with hotspot 902, mobile device 900 initiates a TLS connection to OSU server 904 in exchange 908 and performs server-side authentication using secure HTTPS.

In exchange 910, mobile device 900 transmits sppPostDevData to the server, which includes the DevInfo and DevDetail management objects. The value for requestReason is set to "Subscription registration" indicating that mobile device 900 wishes to register for credentials. OSU server 904 may use the information provided in the DevInfo and DevDetail management objects to determine the type of credential to provision (e.g., username/password or certificate).

In exchange 912, OSU server 904 transmits the sppPostDevDataResponse SOAP method to mobile device 900. The content of the response method informs mobile device 900 of the next step in the online signup process. Since mobile device 900 has signaled for subscription registration, OSU server 904 returns a command for the mobile device to launch a browser to the URI supplied in the message. If no errors occur, sppStatus is set to "OK"; an sppStatus value of "OK" also indicates that the credential provisioning process is not complete.

In exchange 914, mobile device 900 transmits an HTTPS GET request to the URI provided in the sppPostDevDataResponse.

In exchange 916, mobile device 900 and OSU server 904 exchange registration data as designated by the service provider. In certain circumstances, the user can have a subscription which was provisioned using a different mobile device than the one currently in use, the original mobile device may have been re-imaged. or the user had previously setup an account with the service provider (e.g., through their website). In these situations, the subscription has been established, but the mobile device is not in possession of the credential. The message flows of this step may accommodate this scenario and permit the user to have the mobile device provisioned with the credential bound to the previously established subscription.

As illustrated by exchange 918, at the end of the exchange of registration data, mobile device 900 may retrieve from OSU server 904 the sppUserinputResponse XML instance document. This XML instance document can be a hidden document included in the webpage delivered to the mobile device at the conclusion of entering registration data rather than returned as part of exchange 918.

If no error occurred, the sppUserinputResponse is a container for sppStatus and the getCertificate exec command. The sppUserinputResponse XML instance document may be returned having its HTTP content-type set to "application/vnd.wfa.cm+xml." The web browser may pass this XML instance document to the locally registered helper application for processing (e.g., the connection manager). The XML instance document contains the URI of the certificate enrollment server as well as other metadata needed for enrollment.

In exchanges 920 and 922, mobile device 900 performs certificate enrollment. The certificate enrollment process should take a short period of time under typical conditions. Typical conditions are defined to mean that the Wi-Fi hotspot and service provider core networks are not congested, and OSU server 904 and CA 906 are not overloaded. At the end of a successful procedure, mobile device 900 has been provisioned with a certificate that the service provider may use to authenticate mobile device 900. When unsuccessful, mobile device 900 may be notified of certificate enrollment. If the certificate response takes longer than expected, then mobile device 900 may time out and declare that certificate enrollment failed. If mobile device 900 receives a "Pending" response from OSU server 904, mobile device 900 may continue to retry the certificate request, up to a given number of retries. If OSU server 904 has not responded following these retries, mobile device 900 may time out.

Note that the AAA server trust root is provided to mobile device 900 during the certificate enrollment procedure. Validation of the AAA server certification is needed for those EAP methods which employ a server certificate.

In exchange 924, mobile device 900 transmits the sppPostDevData SOAP method to OSU server 904, which includes the OMA-DM DevInfo and DevDetail management objects. Mobile device 900 may set the value for requestReason to "Certificate enrollment completed" if certificate enrollment succeeded or "Certificate enrollment failed" if certificate enrollment failed.

In exchange 926, if certificate enrollment succeeded, OSU server 904 transmits the sppPostDevDataResponse SOAP method to mobile device 900 that includes the addMO command and the PerProviderSubscription management object. The PerProviderSubscription management object contains certificate identifiers binding the provisioned certificate to the subscription as well as ancillary provisioning data. In the sppPostDevDataResponse SOAP method, the sppStatus is set to "Provisioning complete" to indicate that the subscription and certificate provisioning process has been completed.

If certificate enrollment failed, OSU server 904 may respond with one of the following. OSU server 904 may switch to provisioning a machine-managed username/password credential. In this case, the sppPostDevDataResponse SOAP method returned in this exchange may contain an addMO command and PerProviderSubscription management object containing the provisioned, machine-managed username/password credential. The sppStatus may be set to "provisioning complete."

Alternatively, OSU server 904 may switch to provisioning a user-selected username/password credential. In this case, the sppPostDevDataResponse SOAP method returned in this step may contain an exec command to launch a browser to the provided URI. The sppStatus is set to "OK." The message flow may continue as described in FIG. 8, exchange 814.

In yet another example, OSU server 904 may abort the credential provisioning process. In this case, the sppPostDevDataResponse SOAP method returned in this step can include an sppStatus set to "Error occurred," and the sppError element including an errorCode set to "Credentials cannot be provisioned at this time" may be returned.

In exchange 928, the TLS session established in exchange 908 is released. Mobile device 900 can then disassociate from hotspot 902 (illustrated in exchange 930) and associate with hotspot 902 using the newly established credentials and primary SSID 936, as illustrated in 932.

Figure 10:
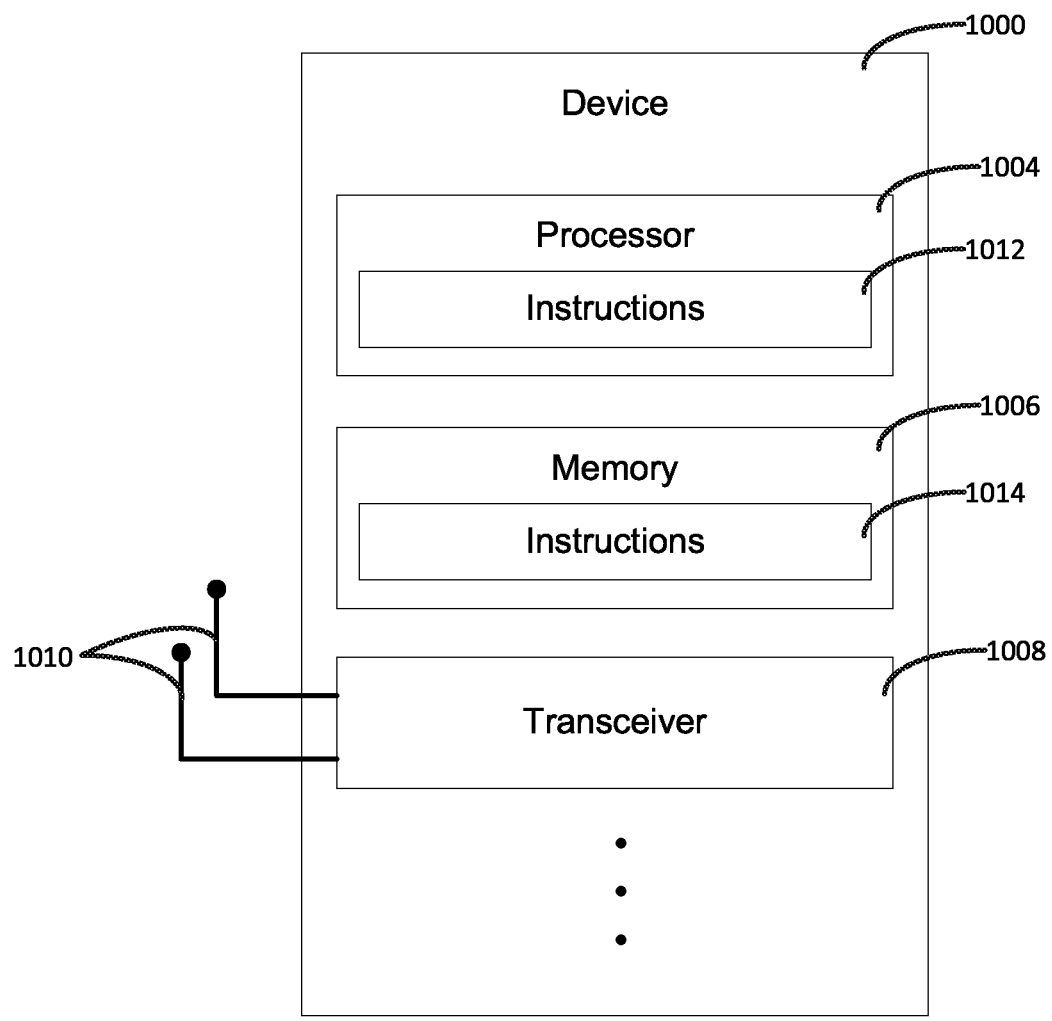
FIG. 10 illustrates a system block diagram, according to some embodiments.

FIG. 10 illustrates a system block diagram, according to some embodiments. FIG. 10 illustrates a block diagram of a mobile device 1000. Device 1000 may include processor 1004, memory 1006, transceiver 1008 (including at least one antenna 1010), instructions 1012, 1014, and possibly other components (not shown). While similar from a block diagram standpoint, it will be apparent to those of skill in the art that the configuration and details of operation of different devices may be similar, or substantially different, depending on the exact device and role.

The processor 1004 comprises one or more central processing units (CPUs), graphics processing units (GPUs), accelerated processing units (APUs), or various combinations thereof. The processor 1004 provides processing and control functionalities for device 1000.

Memory 1006 comprises one or more memory units configured to store instructions and data for device 1000. Transceiver 1008 comprises one or more transceivers including, for an appropriate station or responder, a multiple-input and multiple-output (MIMO) antenna to support MIMO communications. Transceiver 1008 receives transmissions and transmits transmissions, among other things, from and to other devices in one or more networks.

The instructions 1012, 1014 comprise one or more sets of instructions or software executed on a computing device (or machine) to cause such computing device (or machine) to perform any of the methodologies discussed herein. The instructions 1012, 1014 (also referred to as computer- or machine-executable instructions) may reside, completely or at least partially, within processor 1004 and/or the memory 1006 during execution thereof by device 1000. While instructions 1012 and 1014 are illustrated as separate, they can be part of the same whole. The processor 1004 and memory 1006 also comprise machine-readable media.

In FIG. 10, processing and control functionalities are illustrated as being provided by processor 1004 along with associated instructions 1012, 1014. However, these are only examples of processing circuitry that comprise programmable logic or circuitry (e.g., as encompassed within a general-purpose processor or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement a processing circuitry mechanically, in dedicated and permanently configured circuitry, or in temporarily configured circuitry (e.g., configured by software) may be driven by, for example, cost, time, energy-usage, package size, or other considerations.

Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

The term "computer readable medium," "machine-readable medium," and the like should be taken to include a single medium or multiple media (e.g., a centralized or distributed database, and/or associated caches and servers) that store the one or more sets of instructions. The terms shall also be taken to include any medium that is capable of storing, encoding, or carrying a set of instructions for execution by the machine and that cause the machine to perform any one or more of the methodologies of the present disclosure. The term "computer readable medium," "machine-readable medium" shall accordingly be taken to include both "computer storage medium," "machine storage medium" and the like (tangible sources including, solid-state memories, optical and magnetic media, or other tangible devices and carriers but excluding signals per se, carrier waves and other intangible sources) and "computer communication medium," "machine communication medium" and the like (intangible sources including, signals per se, carrier wave signals and the like).

It will be appreciated that, for clarity purposes, the above description describes some embodiments with reference to different functional units or processors. However, it will be apparent that any suitable distribution of functionality between different functional units, processors, or domains may be used without detracting from embodiments herein. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present disclosure has been described in connection with some embodiments, it is not intended to be limited to the specific form set forth herein. One skilled in the art would recognize that various features of the described embodiments may be combined. Moreover, it will be appreciated that various modifications and alterations may be made by those skilled in the art without departing from the scope of the disclosure.

What is claimed is:

1. A non-transitory computer-readable storage medium that stores instructions for execution by one or more processors to perform operations for operating a device in a wireless network, the operations to configure the device to:
    initiate an Extensible Authentication Protocol Transport Layer Security (EAP-TLS) connection with an online signup (OSU) server;
    perform a certificate enrollment with the OSU server to enroll a credential; and receive, in response to the certificate enrollment, a device management (DM) package 4 message including a management object that includes subscription parameters, wherein the subscription parameters include a parameter to indicate the date on which the credential was created or last updated, and a parameter to indicate a realm associated with the credential.

2. The non-transitory computer-readable storage medium of claim 1, wherein the subscription parameters include the date that the credential expires.

3. The non-transitory computer-readable storage medium of claim 1, wherein the subscription parameters include a digital certificate type for the credential, and wherein the digital certificate type includes a value selected from a list including "802.1 ar" and "x509v3".

4. The non-transitory computer-readable storage medium of claim 1, wherein the logic is further to:
    determine whether the device can authenticate to a hotspot based on a comparison between the realm associated with the credential and one or more realms in a list of network access identifier (NAI realms received in a NAI Realm Access Network Query Protocol (ANQP) element.

5. An apparatus including one or more processors, the one or more processors having logic to:

initiate an Extensible Authentication Protocol Transport Layer Security (EAP-TLS) connection with an online signup (OSU) server;

perform a certificate enrollment with the OSU server to enroll a credential; and receive, in response to the certificate-enrollment, a device management (DM) package 4 message including a management object that includes subscription parameters, wherein the subscription parameters include a parameter to indicate the date on which the credential was created or last updated, and a parameter to indicate a realm associated with the credential.

6. The apparatus of claim 5, wherein the subscription parameters include the date that the credential expires.

7. The apparatus of claim 5, wherein the subscription parameters include a digital certificate type for the credential, and wherein the digital certificate type includes a value selected from a list including "802.1 ar" and "x509v3".

8. The apparatus of claim 1, wherein the logic is further to: determine whether the apparatus can authenticate to a hotspot based on a comparison between the realm associated with the credential and a list of network access identifier (NAI) realms in a NAI Realm Access Network Query Protocol (ANQP) element.

9. The apparatus of claim 5, wherein the apparatus further includes: a memory;
two or more antennas; and
a transceiver configured to be coupled to the two or more antennas.

10. A method performed by an apparatus in a wireless communication network, the method comprising:
initiating an Extensible Authentication Protocol Transport Layer Security (EAP-TLS) connection with an online signup (OSU) server;

performing a certificate enrollment with the OSU server to enroll a credential; and receiving, in response to the certificate-enrollment, a device management (DM) package 4 message including a management object that includes subscription parameters, wherein the subscription parameters include a parameter to indicate the date on which the credential was created or last updated, and a parameter to indicate a realm associated with the credential.

11. The method of claim 10, wherein the subscription parameters include the date that the credential expires.

12. The method of claim 10, wherein the subscription parameters include a digital certificate type for the credential, and wherein the digital certificate type includes a value selected from a list including "802.1 ar" and "x509v3".

13. The method of claim 10, further comprising:
determining whether the device can authenticate to a hotspot based on a comparison between the realm associated with the credential and a list of network access identifier (NAI) realms in a NAI Realm Access Network Query Protocol (ANQP) element.

* * * * *